United States Patent
Konireddygari

(10) Patent No.: US 10,185,617 B2
(45) Date of Patent: Jan. 22, 2019

(54) ADJUSTING FAILURE RESPONSE CRITERIA BASED ON EXTERNAL FAILURE DATA

(71) Applicant: LENOVO Enterprise Solutions (Singapore) PTE. LTD., New Tech Park (SG)

(72) Inventor: Sreekanth Konireddygari, Morrisville, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 115 days.

(21) Appl. No.: 15/007,029

(22) Filed: Jan. 26, 2016

(65) Prior Publication Data

US 2017/0212799 A1    Jul. 27, 2017

(51) Int. Cl.
*G06F 11/00* (2006.01)
*G06F 11/07* (2006.01)
*H04L 12/24* (2006.01)

(52) U.S. Cl.
CPC ...... *G06F 11/0793* (2013.01); *G06F 11/0709* (2013.01); *G06F 11/0781* (2013.01); *G06F 11/0784* (2013.01); *H04L 41/00* (2013.01); *G06F 11/073* (2013.01); *G06F 11/076* (2013.01)

(58) Field of Classification Search
CPC ............. G06F 11/0793; G06F 11/0709; G06F 11/0784
See application file for complete search history.

(56) References Cited

U.S. PATENT DOCUMENTS

| | | | | |
|---|---|---|---|---|
| 7,788,544 B2 * | 8/2010 | Allen | .................. | G06F 11/0709 709/223 |
| 2003/0233594 A1 * | 12/2003 | Earl | .................... | G06F 11/0709 714/4.11 |
| 2005/0083834 A1 * | 4/2005 | Dunagan | ............. | G06F 11/0709 370/221 |
| 2008/0225701 A1 * | 9/2008 | Pimlott | ............... | G06F 11/2007 370/221 |
| 2014/0005979 A1 * | 1/2014 | Rao | ..................... | G06F 11/3409 702/179 |
| 2014/0211637 A1 * | 7/2014 | Sawal | ..................... | H04L 41/04 370/244 |

* cited by examiner

*Primary Examiner* — Philip Guyton
(74) *Attorney, Agent, or Firm* — Kunzler, PC

(57) ABSTRACT

Apparatuses, systems, methods, and program products are disclosed for adjusting failure response criteria based on external failure data. A grouping module determines a group of a plurality of devices communicatively connected over a data network. Each device of the group is configured to send failure data to one or more other devices in the group in response to satisfying a failure criterion. A data module receives failure data from at least one device of the group. The failure data indicates that the at least one device of the group has satisfied a failure criterion. A reaction module dynamically adjusts one or more local failure criteria in response to receiving the failure data from the at least one device of the group.

17 Claims, 5 Drawing Sheets

ADJUSTING FAILURE RESPONSE CRITERIA BASED ON EXTERNAL FAILURE DATA

FIELD

The subject matter disclosed herein relates to networked computer systems and more particularly relates to failure management in a networked computer system.

BACKGROUND

Networked computer systems may be used to offload workloads to multiple devices, store data on multiple devices, and so forth. Thus, it can be important to effectively manage how the system reacts when a device within the system fails. Failure management algorithms can establish and monitor certain failure criteria to determine when a device is failing. Failure management algorithms may use fixed failure criteria on a per-system basis that cannot be dynamically adjusted based on failure data from other devices or systems in the networked computer system.

BRIEF SUMMARY

An apparatus for adjusting failure response criteria based on external failure data is disclosed. A method and computer program product also perform the functions of the apparatus. An apparatus, in one embodiment, includes a grouping module that determines a group of a plurality of devices communicatively connected over a data network. Each device of the group may be configured to send failure data to one or more other devices in the group in response to satisfying a failure criterion.

An apparatus, in a further embodiment, includes a data module that receives failure data from at least one device of the group. The failure data may indicate that the at least one device of the group has satisfied a failure criterion. An apparatus, in some embodiments, includes a reaction module that dynamically adjusts one or more local failure criteria in response to receiving the failure data from the at least one device of the group.

In one embodiment, the group of the plurality of devices is associated with a distributed application such that at least a portion of the distributed application executes on each of a plurality of the devices in the group and data associated with the distributed application is stored on each of a plurality of devices in the group. In some embodiments, a grouping module determines the group of devices associated with the distributed application prior to executing the distributed application. In a further embodiment, failure data is sent and received by devices in the group without communication of the failure data to a distributed application.

In certain embodiments, the reaction module adjusts one or more local failure criteria to be more responsive to a failure condition in response to receiving failure data. In various embodiments, the reaction module adjusts one or more local failure criteria to be less responsive to a failure condition in response to not receiving failure data for a period of time. In one embodiment, the one or more local failure criteria are stored in a table accessible by firmware of a device and the reaction module adjusts one or more failure criteria in the table in response to receiving the failure data.

In certain embodiments, the apparatus includes a notification module that provides an alert to a user that indicates that a device in the group satisfied a failure condition. In some embodiments, the data module periodically polls one or more devices of the group of devices for failure data. In a further embodiment, the data module receives failure data on a network channel configured to receive broadcast data. The failure data may be broadcast by a device to each of the devices in the group over the broadcast network channel.

In one embodiment, the data module receives failure data on a port designated for failure data if the failure data is tagged as critical failure data. In some embodiments, the data module receives the failure data from the at least one device of the group at a baseboard management controller of a device. In a further embodiment, failure criteria for a device includes one or more of a storage device criteria, a memory criteria, a CPU criteria, a network adapter criteria, a power criteria, and a heat criteria.

A method, in one embodiment, includes determining, by use of a processor, a group of a plurality of devices communicatively connected over a data network. Each device of the group may be configured to send failure data to one or more other devices in the group in response to satisfying a failure criterion. In a further embodiment, the method includes receiving failure data from at least one device of the group. The failure data may indicate that the at least one device of the group has satisfied a failure criterion. In certain embodiments, the method includes adjusting, dynamically, one or more local failure criteria in response to receiving the failure data from the at least one device of the group.

In one embodiment, the group of the plurality of devices is associated with a distributed application such that at least a portion of the distributed application executes on each of a plurality of the devices in the group and data associated with the distributed application is stored on each of a plurality of devices in the group. In some embodiments, the method includes determining the group of devices associated with the distributed application prior to executing the distributed application.

In certain embodiments, the method includes adjusting the one or more local failure criteria to be more responsive to a failure condition in response to receiving the failure data. In one embodiment, the method includes periodically polling one or more other devices of the group of devices for failure data. In a further embodiment, the method includes receiving failure data on a network channel configured to receive broadcast data, the failure data being broadcast by a device to each of the devices in the group over the broadcast network channel.

A program product, in one embodiment, includes a computer readable storage medium that stores code executable by a processor. In some embodiments, the executable code includes code to perform determining a group of a plurality of devices communicatively connected over a data network. Each device of the group may be configured to send failure data to one or more other devices in the group in response to satisfying a failure criterion. In a further embodiment, the executable code includes code to perform receiving failure data from at least one device of the group. The failure data may indicate that the at least one device of the group has satisfied a failure criterion. In certain embodiments, the executable code includes code to perform adjusting, dynamically, one or more local failure criteria in response to receiving the failure data from the at least one device of the group.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
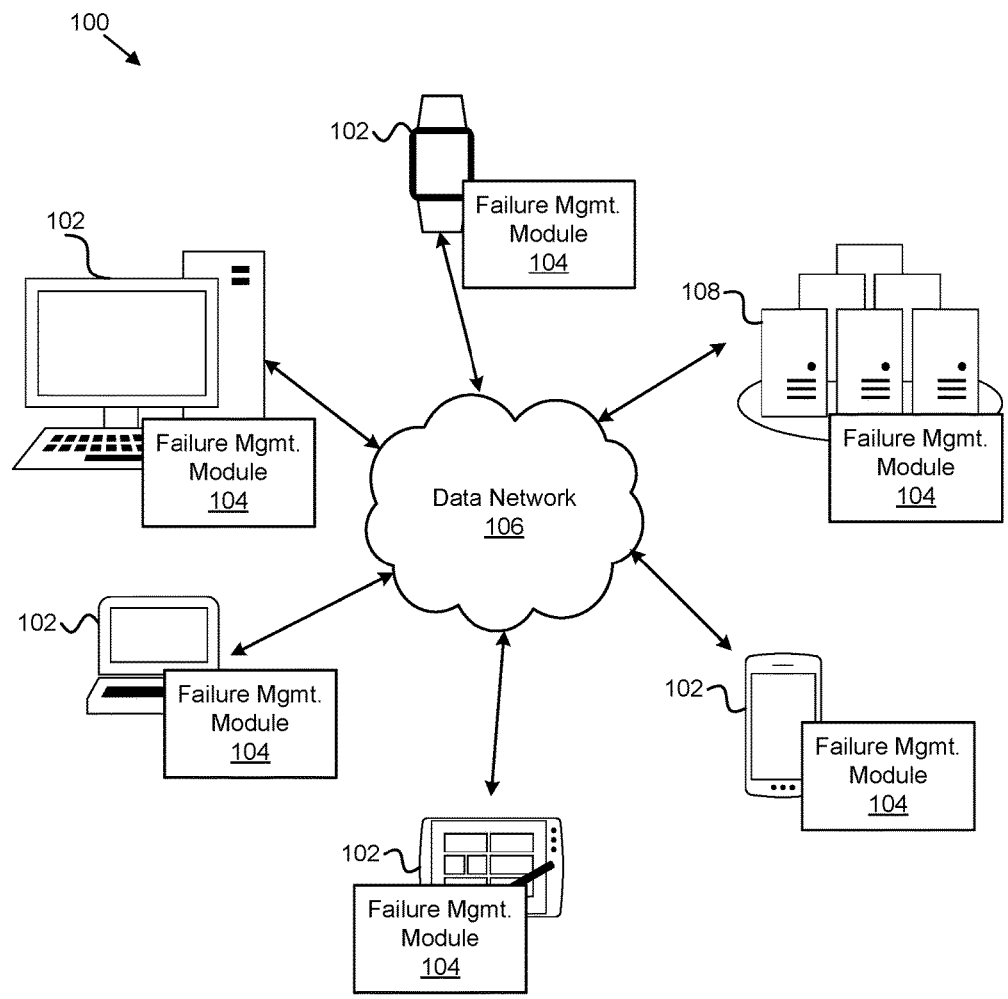
FIG. 1 is a schematic block diagram illustrating one embodiment of a system for adjusting failure response criteria based on external failure data.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for adjusting failure response criteria based on external failure data. In one embodiment, the system 100 includes one or more information handling devices 102, one or more failure management modules 104, one or more data networks 106, and one or more servers 108. In certain embodiments, even though a specific number of information handling devices 102, failure management modules 104, data networks 106, and servers 108 are depicted in FIG. 1, one of skill in the art will recognize, in light of this disclosure, that any number of information handling devices 102, failure management modules 104, data networks 106, and servers 108 may be included in the system 100 for adjusting failure response criteria based on external failure data.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more servers 108 via a data network 106, described below. The information handling devices 102, in a further embodiment, are capable of executing various programs, program code, applications, instructions, functions, or the like, which may access, store, download, upload, and/or the like data located on one or more servers 108.

In one embodiment, the failure management module 104 is configured to dynamically react, by changing or adjusting failure criteria, in response to receiving failure data from one or more devices in the system 100 that may be in a failing or failed state, e.g., the devices may be unavailable or may become unavailable. In some embodiments, the failure management module 104 is configured to determine a group of a plurality of devices communicatively connected over a data network 106. Each device of the group may be configured to send failure data to one or more other devices in the group in response to satisfying a failure criterion. In a further embodiment, the failure management module 104 is configured to receive failure data from at least one device of the group. The failure data may indicate that the at least one device of the group has satisfied a failure criterion. The failure management module 104, in some embodiments, is configured to dynamically adjust one or more local failure criteria in response to receiving the failure data from the at least one device of the group.

The failure management module 104, in one embodiment, dynamically adjusts local failure criteria, thresholds, and/or the like in response to receiving failure data from one or more devices external to the local device. For instance, in a distributed system, if device A suffers a failure condition such that one or more failure criteria are satisfied, device A may send failure data to device B and device C regarding the failure state of device A. Accordingly, the failure management module 104 may react to the received failure data by dynamically changing, modifying, creating, removing, and/or adjusting one or more local failure criteria of devices B and C. In this manner, the failure management module 104 may adjust local failure criteria to detect and/or predict potential failure conditions earlier and provide time to manage the potential failure condition to protect the integrity of applications associated with the group of devices. The failure management module 104, including its various sub-modules 202-208, may be located on one or more devices in the group, on a different device connected to the network that monitors the devices in the group, and/or the like. The failure management module 104 is described in more detail below with reference to FIG. 2.

In various embodiments, the failure management module 104 may be embodied as a hardware appliance that can be installed or deployed on an information handling device 102, one a server 108, or elsewhere on the data network 106. In certain embodiments, the failure management module 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a USB connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the failure management module 104 may include a power interface, a wired and/or wireless network interface, a graphical interface that attaches to a display, and/or a semiconductor integrated circuit device as described below, configured to perform the functions described herein with regard to the failure management module 104.

The failure management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the failure management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the failure management module 104.

The semiconductor integrated circuit device or other hardware appliance of the failure management module 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the failure management module 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

The one or more servers 108 may be communicatively coupled (e.g., networked) over a data network 106 in a distributed system. As used herein, a distributed system is a software system in which components (e.g., hardware devices, applications, and/or the like) located on networked devices communicate and coordinate by passing messages to each other. Furthermore, an application or program that executes in a distributed system may be a distributed application. In such a distributed system, at least a portion of the distributed application may execute on multiple servers 108, the distributed application may store data associated with the application on multiple servers 108, and/or the like. As described above, the servers 108 within a distributed system may be co-located, or may be located at various sites. Regardless, the servers 108 of a distributed system may be communicatively coupled over a data network 106 to share information, including failure data, by sending messages back and forth.

Figure 2:
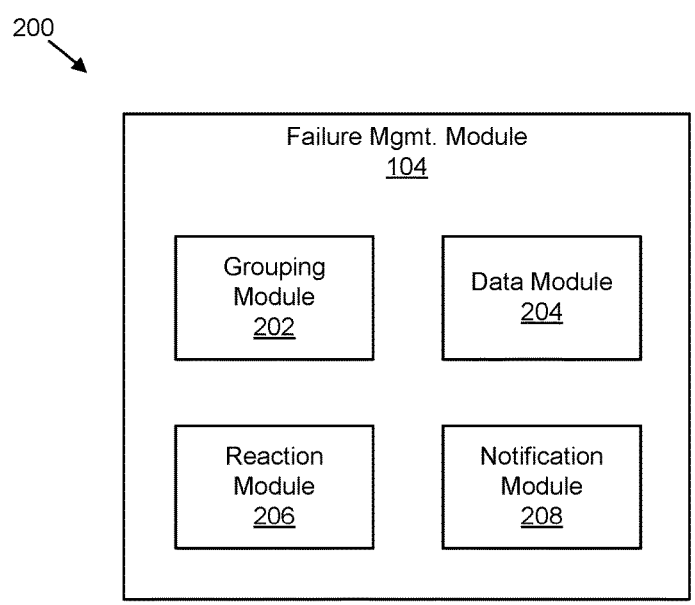
FIG. 2 is a schematic block diagram illustrating one embodiment of a module for adjusting failure response criteria based on external failure data.

FIG. 2 depicts one embodiment of a module 200 for adjusting failure response criteria based on external failure data. The module 200 may include an embodiment of a failure management module 104. The failure management module 104 may include one or more of a grouping module 202, a data module 204, a reaction module 206, and a notification module 208, which are described in more detail below.

The grouping module 202, in one embodiment, determines a group of a plurality of devices communicatively connected over a data network 106. In certain embodiments, the group of devices is a subset of a plurality of devices in a networked system. The plurality of devices, in one embodiment, may include one or more of a clustered computing system, a distributed computing system, a storage system, a cloud system, and/or the like, and may include one or more information handling device 102 and/or servers 108.

In certain embodiments, the grouping module 202 determines which devices belong to a group based on an application associated with each device of the group. For example, in a distributed system, the grouping module 202 may determine that three devices out of five devices in the distributed system are associated with a distributed application, meaning that the three devices may execute at least a portion of the application (e.g., one or more threads of execution of the application, or the like), may store data accessed, read, or the like by the application, may include libraries, code, databases, and/or the like used by the application, and/or the like. For example, if a distributed application employs data redundancy among multiple devices (e.g., using Apache Hadoop's® Hadoop Distributed File System ("HDFS") to distribute blocks of data among multiple servers), the grouping module may determine that each device that participates in storing redundant data for the application is a member of a group. In certain embodiments, the distributed application is in communication with the grouping module 202 and notifies the grouping module 202 which devices and storage nodes are associated with the distributed application and should be flagged as members of a group.

In another example, a distributed application such as a web server may offload one or more threads of execution to one or more devices within the distributed computing system. Additionally, the distributed application may store data on various storage nodes within the distributed computing system, e.g., different databases located on different devices within the distributed computing system. Accordingly, the grouping module 202 may determine which devices and storage nodes are associated with the distributed application, e.g., which devices execute threads for the application and which storage nodes store data for the application. In this manner, when a local failure criterion for a device in the group is satisfied, the other devices in the group may proactively react to the failure, in real-time, by adjusting one or more local failure criteria and/or maintaining the performance, integrity, and/or availability of the distributed application.

For example, application threads or processing may be moved to other devices in the group, the application may be safely exited, data for the application may be stored, and/or the like. As described below, the other devices in the group may adjust one or more local failure criteria such that a device is more reactive to potential failure conditions, which may allow a device to predict and manage potential critical failure conditions that may permanently damage the device, the application, data stored for the application, and/or the like, and/or provide additional time to plan for a potential failure of a device.

In one embodiment, the grouping module 202 determines the group of devices associated with the distributed application prior to executing the distributed application. In such an embodiment, the grouping module 202 may determine which devices of the plurality of devices in the distributed system execute a portion of the distributed application, store data associated with the distributed application, and/or the like, before the distributed application is executed on the system. For example, the grouping module 202 may determine the group of devices associated with the distributed application during startup (e.g., at boot time before an operating system is loaded), after the operating system is loaded (but before the distributed application is executed), in response to receiving a command to execute the distributed application (right before the distributed application is executed), and/or the like. In such an embodiment, the distributed application may be executed from one or more of the devices of the group.

In one embodiment, after the grouping module 202 determines which devices include the group of devices associated with the distributed application, the grouping module 202 may send a signal, message, notification, alert, and/or the like to each device within the group of devices to notify each device that it is a member of the group. A device may be a member of multiple groups that correspond to multiple distributed applications executing within the distributed system. Accordingly, the grouping module 202 may assign a group identifier to each group associated with each distributed application and share the group identifier with each device in the group.

In one embodiment, each device of the group associated with a distributed application is configured to send failure data over the data network 106 to one or more other devices in the group in response to satisfying a failure criterion. The failure data may be used in various failure management algorithms, e.g., predictive failure analysis ("PFA") algorithms to analyze trends in a system and adjust for potential failure conditions. The failure data may include data describing the reliability, availability, and serviceability ("RAS") of a device and/or system. For example, the failure data may include a probability that a device or system will produce correct outputs up to some given time, a probability that a device or system is operational at a given time, a time to repair a device or system, and/or the like, based on the error that triggered the failure condition. In one embodiment, failure criteria for a device includes one or more of a storage device criteria, a memory criteria, a CPU criteria, a network adapter criteria, a power criteria, a heat criteria, and/or the like, which may indicate that the device is about to fail, is failing, or has failed.

For example, storage device failure criteria may include a count of bad sectors of a hard drive, a capacity of a storage medium, or the like. Memory failure criteria may include a count of a number of stable memory units (RAM DIMMs), a number of single bit memory errors, or the like. CPU failure criteria may include a number of usable processor cores, a number of operations per second, a CPU temperature, or the like. Network adapter failure criteria may include a bandwidth of the network adapter, a number of dropped packets at the network adapter, or the like. Power failure criteria may include a measurement of power, a number of times that the power fails on the device, a power output of a power supply, or the like. Heat failure criteria may include a temperature within a device, a temperature of one or more components of the device, or the like.

Each failure criteria may have a corresponding failure threshold. For example, if a device includes eight RAM DIMMs, the memory failure threshold may be six RAM DIMMs such that if more than two RAM DIMMs fail, the memory failure criteria will be satisfied, and the device may send failure data to one or more other devices in a group of devices that the device is a member of (e.g., the device may determine which devices to send the failure data based on which devices are associated with the device's group identifier(s)). In another example, the temperature of a device may reach a threshold temperature, a CPU may reach a processing threshold, a storage device may reach a capacity threshold or have an associated threshold of bad sectors that are allowable, a memory unit may satisfy a threshold number of single bit memory errors, and/or the like.

In one embodiment, the failure data may include failure information such as the type of failure that occurred, the specific details of the failure (e.g., the temperature of the device exceeded a safe threshold temperature), how long the device is expected to be down, and/or the like. Similarly, the failure data may include device information such as the device's IP address, MAC address, group identifier, device identifier, and/or the like.

The data module 204, in one embodiment, receives failure data from at least one device of the group of devices. As described above, the failure data may indicate that the at least one device of the group has satisfied a failure criterion and may become unavailable. The failure data may be received using a standard communication protocol and data packet, such as TCP, UDP, and/or the like. The failure data may be encrypted and/or may be formatted as plain text, XML, HTML, or the like, in the payload of the data packet.

In some embodiments, the data module 204 receives failure data on a network channel configured to receive broadcast data. In such an embodiment, the failure data may be broadcast by a device to each of the other devices in the group over the broadcast network channel. For example, in response to determining that a failure criterion of a device has been satisfied, the device may broadcast failure data to each device in the group on one or more specific ports that have been designated as broadcast ports for receiving failure data.

In certain embodiments, the data module 204 may receive standard failure data on a different port, or lower priority port, than critical failure data, which may be received on a higher priority port. For example, port 1667 may be designated as a port to listen on to receive standard failure data, or data that has not been tagged as critical failure data. Non-critical failure data may include failure data indicating that a device has not yet reached a critical failure level, e.g., the device has not failed or will not fail within a predefined period of time. Such data may include failure status notifications, statistics for various components of the device, and/or the like. Continuing with the previous example, port 1668 may be designated as a port to listen on to receive critical failure data, or data that has been tagged as critical failure data. Critical failure data may include failure data indicating an emergency state of a device, e.g., the device may have failed or will fail within a short period of time. In some embodiments, failure data received on a port designated as a critical failure data port will cause the system to interrupt and react or respond immediately to the received failure data, e.g. the data module 204 may trigger the reaction module 206 to dynamically adjust one or more local failure criteria.

In one embodiment, the data module 204 periodically polls one or more devices of the group of devices for failure data. For example, instead of broadcasting failure data from a device, a device may send failure data to a different device in response to the data module 204 requesting failure data from a device. The data module 204 may periodically send a request to each of the other devices in the group for failure data. For example, the data module 204 may poll the other devices in a group every minute for failure data to determine the status of the other devices in the group. However, even in such an embodiment, a device may broadcast critical failure data to each device in the group in response to satisfying a critical failure threshold.

In certain embodiments, the data module 204 receives the failure data from the at least one device of the group at a baseboard management controller ("BMC") of a device. As used herein, a BMC is a service processor that monitors the physical state of a device, e.g., an information handling device 102, a server 108, etc., using one or sensors. A BMC may also perform other functions. For example, the devices in the group associated with a distributed application may include various sensors (e.g., thermal sensors, etc.) that monitor and detect the health of various components of a device, which may be communicated to the BMC. The data module 204, in some embodiments, may be embodied as firmware of the BMC in order to send and receive data from/to the BMC.

In some embodiments, the failure data is sent and received by devices in the group without communication of the failure data to the distributed application. A distributed application, for example, may be unaware that a device in the group is failing, and that the other devices in the group have compensated for the failing device in response to failure data received from the failing device. In this manner, execution of the distributed application does not need to be interrupted to handle the failure condition in the system. Instead, the devices may automatically react to the failure condition by offloading processing to various other devices, ensuring data for the application is being saved, and/or the like, without impeding the performance, availability, and/or reliability of the distributed application.

The reaction module 206, in certain embodiments, dynamically adjusts one or more local failure criteria in response to receiving the failure data from the at least one device of the group. In certain embodiments, the reaction module 206 adjusts the local failure criteria to be different from the default boot-time settings for the failure criteria. In one embodiment, the reaction module 206 adjusts the one or more local failure criteria to be more responsive or aggressive to a failure condition in response to receiving the failure data. For example, the reaction module 206 may adjust a memory failure criteria threshold for a count of corrected RAM intermittent errors, which may indicate a memory failure, such that the threshold may be satisfied by detecting a lesser number of corrected RAM intermittent errors than originally set. In this manner, the failure management module 104 may detect and/or predict potential device failures earlier in order to protect the integrity and reliability of the distributed application in the future.

In one embodiment, the degree to which the reaction module 206 adjusts the local failure criteria depends on the type of received failure data. For example, if the received failure data indicates a critical failure condition on a device, then the reaction module 206 may adjust the local failure criteria to be more aggressive than if the received failure data indicates a lower priority failure condition. For example, if the received failure data indicates that a device will be unavailable within one minute due to a power failure, the reaction module 206 may adjust the local failure criteria of other devices in the group to be more responsive to local errors in order to protect the application from potential failure situations in the future until the application's processing can be stabilized in the absence of the failed device.

On the other hand, if the received failure data indicates that a component of a device has failed, such as a single RAM DIMM, but the device is still available to perform certain tasks for the application, the reaction module 206 may adjust one or more local failure criteria to be more responsive to local errors, to protect the application in the event that a device fails in the future, but to a lesser extent than if the failure data indicated a critical device failure. Regardless of the criticality of the failure, the reaction module 206 may adjust local failure criteria to be more aggressive in order to detect and/or predict potential failure conditions earlier and provide time to manage the potential failure condition to protect the integrity of the application.

In some embodiments, the reaction module 206 adjusts the one or more local failure criteria to be less responsive to a failure condition in response to not receiving failure data for a period of time. For example, if the system has been running in a stable condition for a predefined amount of time (e.g., 3 months) without any failure data being sent or received from other devices, the reaction module 206 may loosen or relax one or more failure criteria and/or failure criteria thresholds. By relaxing the failure criteria, devices may not have to monitor for failure conditions, and send status messages to other devices in the group, as often as under normal failure criteria monitoring, which may save processing cycles for other tasks and bandwidth on the data network 106.

In a further embodiment, the one or more local failure criteria are stored in a table, database, data store, or the like accessible by firmware of a device (e.g., by firmware of a BMC). The failure criteria table may be stored in a basic input/output system ("BIOS"), or a portion of a BIOS, in one or more controllers and other low-level hardware devices. In such an embodiment, the reaction module 206 adjusts one or more failure criteria in the table in response to receiving the failure data. For example, the reaction module 206 may adjust one or more failure criteria thresholds in the table in response to the received failure data.

By dynamically adjusting failure criteria, other devices in the group may react more aggressively to the failing device to proactively maintain the robustness and integrity of the system by notifying other devices in the group of potential indicators of device failures so that the other devices can react accordingly to enable failure management protocols (e.g., notify an administrator, save data more often, monitor for device failure indicators more often, and/or the like), unlike conventional failure management systems that use fixed, pre-determined criteria established on a per-system basis and cannot be dynamically adjusted to account for changes to devices within the system.

The apparatus 200 optionally may include a notification module 208, in one embodiment, that provides an alert to a user indicating that a device in the group satisfied a failure condition. The notification module 208, for example, may notify a system administrator that a particular device satisfied failure criteria for a storage device by detecting a number of bad sectors of a hard drive exceeds a predefined threshold for bad sectors. The notification module 208 may send a message, alert, notification, or the like to a user using one or more electronic communication means, such as text message, SMS, email, instant message, social media message, push notifications to mobile applications, and/or the like.

In one example embodiment, the user may manually modify the failure criteria of devices in the group that received the failure data. In this manner, a user may customize the failure criteria for each device based on the configuration of the device and the user's system goals.

Figure 3:
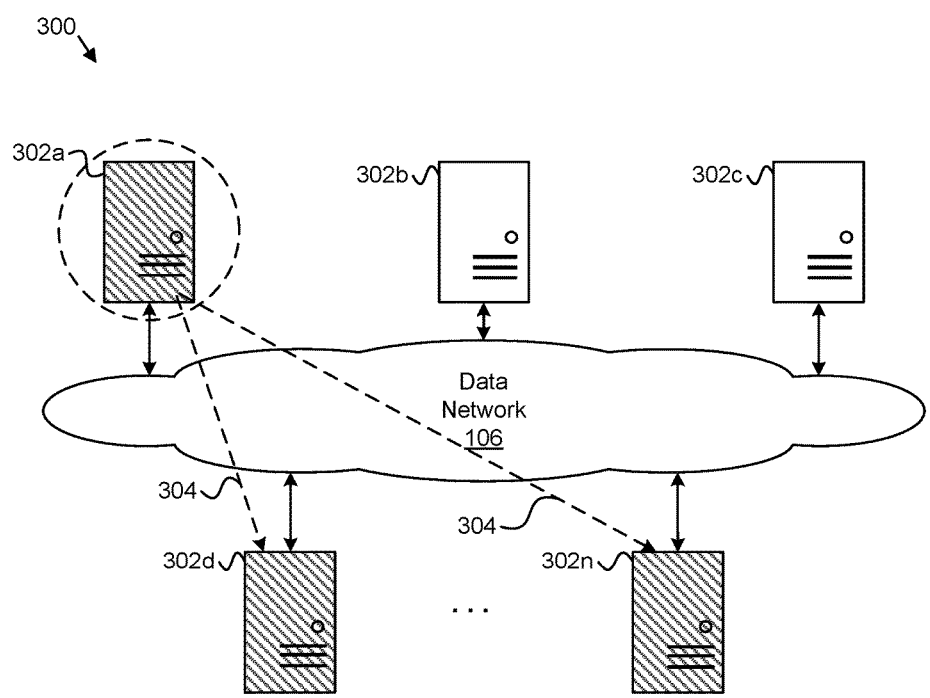
FIG. 3 is a schematic block diagram illustrating one embodiment of a system for adjusting failure response criteria based on external failure data.

FIG. 3 depicts one embodiment of a system 300 for adjusting failure response criteria based on external failure data. The system 300 depicted in FIG. 3, in one embodiment, is a distributed system that includes one or more devices 302a-n and a data network 106. The grouping module 202 may determine which of the devices 302a-n belong to a group associated with a distributed application. For example, the grouping module 202 may determine that the highlighted devices 302a, 302d-302n, are associated with the distributed application while devices 302b and 302c are not associated with the distributed application.

In one embodiment, if a device 302a determines that one or more failure criteria have been satisfied, the device may send failure data to the other devices 302d-302n in the group. For example, if a device 302a experiences a number of single bit memory errors such that the number of errors satisfies a memory failure threshold for single bit memory errors, the device 302a may send failure data 304 regarding the memory failure to the other devices 302d-302n in the group. Accordingly, the data module 204 may receive the failure data 304 at each of the devices 302d-302n and, based on the received failure data 304, the reaction module 206 may dynamically adjust one or more local failure criteria.

For example, the reaction module 206 may edit, modify, create, remove, or the like one or more failure criteria or failure criteria thresholds to compensate for the failing device 302a. For instance, the reaction module 206 may adjust failure criteria thresholds so that the devices are more responsive to potential failure conditions, e.g., the reaction module 206 may lower certain thresholds so that a lower number of detected errors may satisfy the thresholds and trigger a failure condition (e.g., 10 single bit memory errors per minute instead of 30 single bit memory errors per minute).

Figure 4:
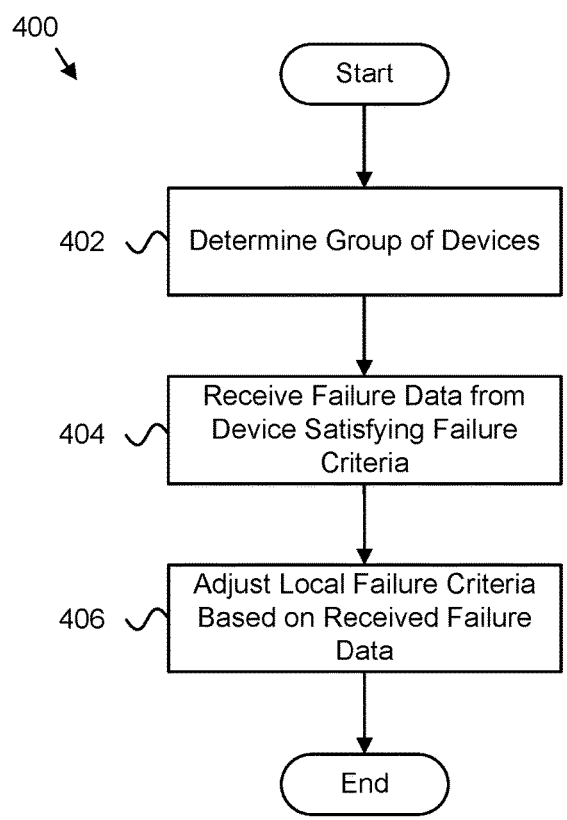
FIG. 4 is a schematic flow chart diagram illustrating one embodiment of a method for adjusting failure response criteria based on external failure data.

FIG. 4 depicts one embodiment of a method 400 for adjusting failure response criteria based on external failure data. In one embodiment, the method 400 begins and determines 402 a group of a plurality of devices communicatively connected over a data network. In some embodiments, each device of the group is configured to send failure data to one or more other devices in the group in response to satisfying a failure criterion. In one embodiment, the grouping module 202 determines 402 a group of a plurality of devices communicatively connected over a data network.

In a further embodiment, the method 400 receives 404 failure data from at least one device of the group. The failure data may indicate that the at least one device of the group has satisfied a failure condition. In one embodiment, the data module 204 receives 404 failure data from at least one device of the group. In various embodiments, the method 400 dynamically adjusts 406 one or more local failure criteria in response to receiving the failure data from the at least one device of the group, and the method 400 ends. The reaction module 206, in some embodiments, dynamically adjusts 406 one or more local failure criteria in response to receiving the failure data from the at least one device of the group.

Figure 5:
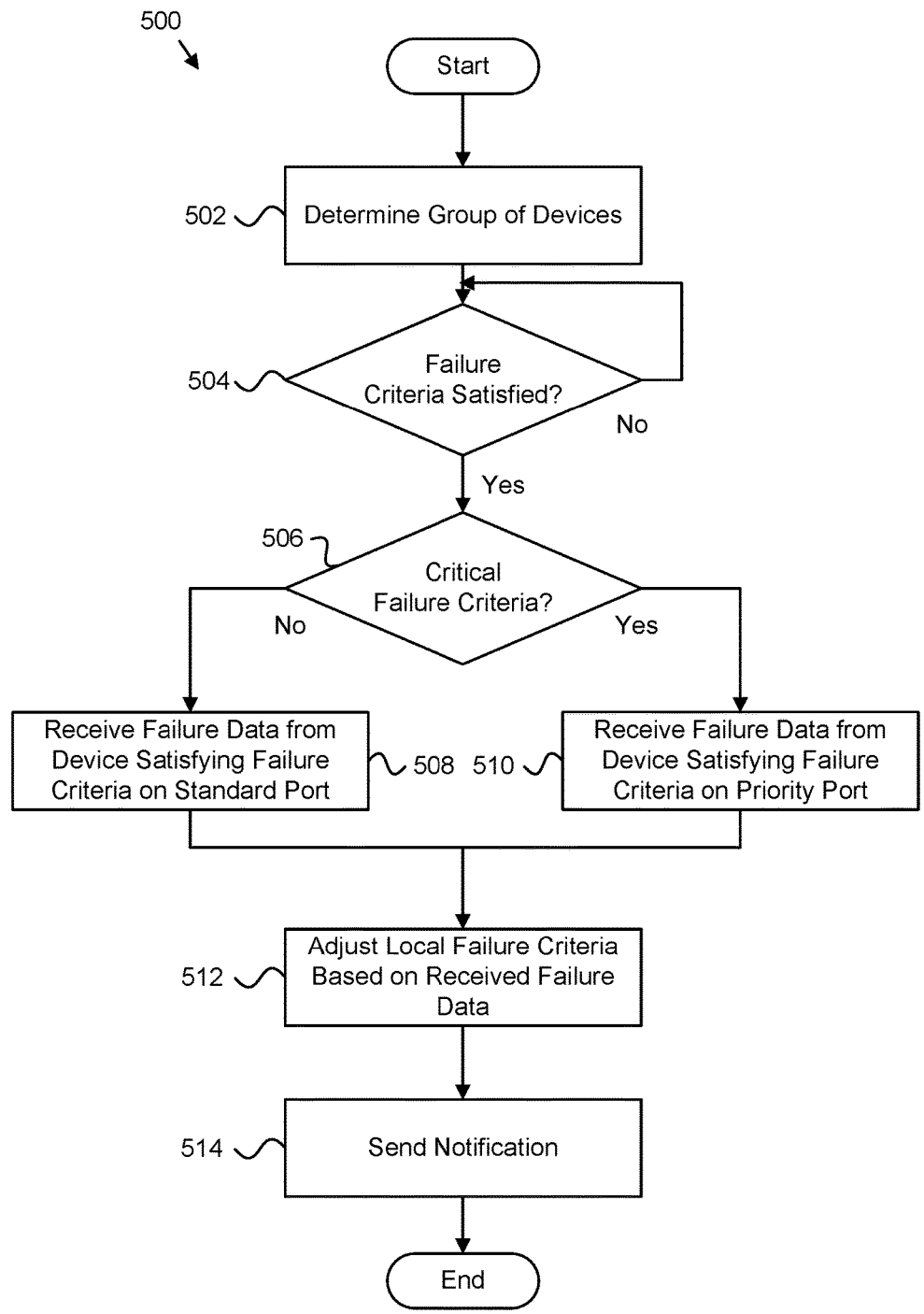
FIG. 5 is a schematic flow chart diagram illustrating one embodiment of another method for adjusting failure response criteria based on external failure data.

FIG. 5 depicts one embodiment of another method 500 for adjusting failure response criteria based on external failure data. In one embodiment, the method 500 begins and determines 502 a group of a plurality of devices communicatively connected over a data network. In one embodiment, the grouping module 202 determines 402 a group of a plurality of devices communicatively connected over a data network. The method 500, in a further embodiment, determines 504 whether a failure criterion of a device of the group has been satisfied. If not, the method 500 continues to monitor and determine 504 whether a failure criterion has been satisfied for a device in the group.

If the method 500 determines 504 that a failure criterion has been satisfied, the method 500 determines 506 whether the satisfied failure criteria is a critical failure criterion (e.g., temperature too high, power outage and secondary power running low, etc.). If the method 500 determines 506 that the satisfied failure criteria is not a critical failure criterion, then the method 500 receives 508 failure data from the device that satisfied the failure criteria on a standard port. Otherwise, the method 500 receives 510 failure data from the device that satisfied the failure criteria on a priority port, which may cause an interrupt in the processing of the device that received the data in order to process the failure data. In certain embodiments, the data module 204 receives 508, 510 the failure data.

The method 500, in a further embodiment, dynamically adjusts 512 one or more local failure criteria in response to receiving the failure data from the at least one device of the group. The reaction module 206, in some embodiments, dynamically adjusts 512 one or more local failure criteria in response to receiving the failure data from the at least one device of the group. In one embodiment, the method 500 sends 514 a notification to a user, such as a system administrator, regarding the failure data, and the method 500 ends. In one embodiment, the notification module 208 sends 514 a notification to a user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a grouping module that determines a group of a plurality of devices communicatively connected over a data network, each device of the group configured to send failure data to one or more other devices in the group in response to satisfying a failure criterion;
a data module that receives failure data from at least one device of the group, the failure data comprising one or more of non-critical failure data and critical failure data, the non-critical failure data received at a first port and the critical failure data received at a second port that is different from the first port, the failure data indicating that the at least one device of the group has satisfied a failure criterion; and
a reaction module that dynamically adjusts one or more local thresholds for one or more local failure criteria of a local device of the group in response to receiving the failure data at the local device from the at least one device of the group, the one or more local thresholds adjusted to a greater degree if the failure data comprises critical failure data than if the failure data comprises non-critical failure data so that the local device is more responsive to errors triggered by one or more local failure conditions.

2. The apparatus of claim 1, wherein the group of the plurality of devices is associated with a distributed application, wherein one or more of at least a portion of the distributed application executes on each of a plurality of the devices in the group and data associated with the distributed application is stored on each of a plurality of devices in the group.

3. The apparatus of claim 2, wherein the grouping module determines the group of devices associated with the distributed application prior to executing the distributed application.

4. The apparatus of claim 2, wherein failure data is sent and received by devices in the group without communication of the failure data to the distributed application.

5. The apparatus of claim 1, wherein the reaction module adjusts the one or more local failure criteria to be less responsive to a failure condition in response to not receiving failure data for a period of time.

6. The apparatus of claim 1, wherein the one or more local failure criteria are stored in a table accessible by firmware of a device, the reaction module adjusting one or more failure criteria in the table in response to receiving the failure data.

7. The apparatus of claim 1, further comprising a notification module that provides an alert to a user indicating that a device in the group satisfied a failure condition.

8. The apparatus of claim 1, wherein the data module periodically polls one or more devices of the group of devices for failure data.

9. The apparatus of claim 1, wherein the data module receives failure data on a network channel configured to receive broadcast data, the failure data being broadcast by a device to each of the devices in the group over the broadcast network channel.

10. The apparatus of claim 1, wherein the data module receives the failure data from the at least one device of the group at a baseboard management controller of a device.

11. The apparatus of claim 1, wherein failure criteria for a device comprises one or more of a storage device criteria, a memory criteria, a CPU criteria, a network adapter criteria, a power criteria, and a heat criteria.

12. A method comprising:
determining, by use of a processor, a group of a plurality of devices communicatively connected over a data network, each device of the group configured to send failure data to one or more other devices in the group in response to satisfying a failure criterion;
receiving failure data from at least one device of the group, the failure data comprising one or more of non-critical failure data and critical failure data, the non-critical failure data received at a first port and the critical failure data received at a second port that is different from the first port, the failure data indicating that the at least one device of the group has satisfied a failure criterion; and
adjusting, dynamically, one or more local thresholds for one or more local failure criteria of a local device of the group in response to receiving the failure data at the local device from the at least one device of the group, the one or more local thresholds adjusted to a greater degree if the failure data comprises critical failure data than if the failure data comprises non-critical failure data so that the local device is more responsive to errors triggered by one or more local failure conditions.

13. The method of claim 12, wherein the group of the plurality of devices is associated with a distributed application, wherein one or more of at least a portion of the distributed application executes on each of a plurality of the devices in the group and data associated with the distributed application is stored on each of a plurality of devices in the group.

14. The method of claim 13, further comprising determining the group of devices associated with the distributed application prior to executing the distributed application.

15. The method of claim 12, further comprising periodically polling one or more other devices of the group of devices for failure data.

16. The method of claim 12, further comprising receiving failure data on a network channel configured to receive broadcast data, the failure data being broadcast by a device to each of the devices in the group over the broadcast network channel.

17. A program product comprising a computer readable storage medium that stores code executable by a processor, the executable code comprising code to perform:
   determining a group of a plurality of devices communicatively connected over a data network, each device of the group configured to send failure data to one or more other devices in the group in response to satisfying a failure criterion;
   receiving failure data from at least one device of the group, the failure data comprising one or more of non-critical failure data and critical failure data, the non-critical failure data received at a first port and the critical failure data received at a second port that is different from the first port, the failure data indicating that the at least one device of the group has satisfied a failure criterion; and
   adjusting, dynamically, one or more local thresholds for one or more local failure criteria of a local device of the group in response to receiving the failure data at the local device from the at least one device of the group, the one or more local thresholds adjusted to a greater degree if the failure data comprises critical failure data than if the failure data comprises non-critical failure data so that the local device is more responsive to errors triggered by one or more local failure conditions.

* * * * *